(12) United States Patent
Akiyama

(10) Patent No.: US 9,434,380 B2
(45) Date of Patent: Sep. 6, 2016

(54) DRIVING ASSISTANCE APPARATUS FOR VEHICLE

(75) Inventor: Tomonori Akiyama, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 109 days.

(21) Appl. No.: 14/368,126

(22) PCT Filed: Dec. 28, 2011

(86) PCT No.: PCT/JP2011/080410
§ 371 (c)(1),
(2), (4) Date: Jun. 23, 2014

(87) PCT Pub. No.: WO2013/098996
PCT Pub. Date: Jul. 4, 2013

(65) Prior Publication Data
US 2014/0343792 A1    Nov. 20, 2014

(51) Int. Cl.
*B60W 30/09*  (2012.01)
*B60W 30/095* (2012.01)
*G06K 9/00*   (2006.01)
*B60W 10/184* (2012.01)
*B60W 10/20*  (2006.01)
*B60W 30/10*  (2006.01)

(52) U.S. Cl.
CPC ............ *B60W 30/09* (2013.01); *B60W 10/184* (2013.01); *B60W 10/20* (2013.01); *B60W 30/0956* (2013.01); *B60W 30/10* (2013.01); *G06K 9/00798* (2013.01)

(58) Field of Classification Search
CPC . G06K 9/00798; H04N 7/183; B60W 30/09; B60W 30/0956
See application file for complete search history.

(56) References Cited

U.S. PATENT DOCUMENTS

| 7,698,032 | B2 * | 4/2010 | Matsumoto | B60T 8/17557 180/170 |
| 7,808,523 | B2 * | 10/2010 | Nishida | G05D 1/0246 348/148 |
| 8,258,935 | B2 * | 9/2012 | Hashimoto | B60W 50/14 180/167 |
| 8,311,729 | B2 * | 11/2012 | Saito | G08G 1/165 701/117 |
| 8,462,988 | B2 * | 6/2013 | Boon | G06K 9/00798 382/103 |
| 8,600,655 | B2 * | 12/2013 | Ishikawa | G01C 21/26 382/104 |
| 8,612,138 | B2 * | 12/2013 | Yeh | G01C 21/32 701/409 |
| 8,744,194 | B2 * | 6/2014 | Kawasaki | G06K 9/00798 348/113 |
| 2001/0020217 | A1 | 9/2001 | Matsuno | |

(Continued)

FOREIGN PATENT DOCUMENTS

| CN | 201825037 U * | 5/2011 |
| JP | 11-014346 A  | 1/1999 |

(Continued)

*Primary Examiner* — Tuan C. To
(74) *Attorney, Agent, or Firm* — Sughrue Mion, PLLC

(57) ABSTRACT

An object of the present invention is to provide a technology that enables avoidance of situations in which the driver's own vehicle enters the course of a vehicle behind with a change in the course of the driver's own vehicle without relying upon a device for detecting the vehicle running diagonally behind the driver's own vehicle in a driving assistance apparatus that causes the driver's own vehicle to change its course to avoid a collision with a solid object existing in the course of the vehicle. To achieve the object, according to the present invention, a change of the course of the driver's own vehicle is forbidden when a dividing line indicating a lane boundary is not detected on the road between the driver's own vehicle and a solid object.

4 Claims, 10 Drawing Sheets

(56) References Cited

U.S. PATENT DOCUMENTS

| | | |
|---|---|---|
| 2005/0125153 A1 | 6/2005 | Matsumoto et al. |
| 2009/0157247 A1* | 6/2009 | Sjogren ............... G08G 1/167 701/23 |
| 2009/0296987 A1* | 12/2009 | Kageyama ......... G06K 9/00798 382/103 |
| 2010/0188200 A1 | 7/2010 | Hashimoto et al. |
| 2011/0022317 A1 | 1/2011 | Okita |
| 2011/0231095 A1* | 9/2011 | Nakada ............... B60W 30/12 701/301 |
| 2012/0316730 A1* | 12/2012 | Zhang ................. B60W 10/20 701/41 |
| 2013/0272577 A1* | 10/2013 | Sakamoto ............ G08G 1/167 382/103 |
| 2013/0274959 A1* | 10/2013 | Igarashi .......... G08G 1/096844 701/1 |
| 2013/0321172 A1* | 12/2013 | Igarashi ............... G08G 1/166 340/905 |
| 2013/0345900 A1* | 12/2013 | Usui .................... B60W 30/12 701/1 |

FOREIGN PATENT DOCUMENTS

| | | |
|---|---|---|
| JP | 2000-159077 A | 6/2000 |
| JP | 2001-247023 A | 9/2001 |
| JP | 2009-280015 A | 12/2009 |
| JP | 2010-18207 A | 1/2010 |
| KR | 20110001425 A * | 1/2011 |

* cited by examiner

DRIVING ASSISTANCE APPARATUS FOR VEHICLE

CROSS REFERENCE TO RELATED APPLICATIONS

This is a National Stage of International Application No. PCT/JP2011/080410 filed Dec. 28, 2011, the contents of which are incorporated herein by reference in its entirety.

TECHNICAL FIELD

The present invention relates to technologies of providing driving assistance for avoiding an obstacle existing in the course of a vehicle.

BACKGROUND ART

There has been developed heretofore a technology in which if it is determined that it is not possible to achieve deceleration of the driver's own vehicle to avoid a collision with an obstacle, the course of the driver's own vehicle is changed (see, for example, Patent Document 1). This technology enables the driver's own vehicle to avoid a collision with the obstacle. However, if another vehicle is running diagonally behind the driver's own vehicle, there is a possibility that the change in the course will cause the driver's own vehicle to enter the course of the vehicle behind.

As a countermeasure to this, there has also been developed a technology pertaining to a steering control apparatus that causes the driver's own vehicle to change the lane in which it travels in order to avoid a collision with a vehicle ahead of the driver's own vehicle, in which if a vehicle traveling behind in the lane in which the driver's own vehicle is to travel after the lane change is detected and there is a possibility that the driver's own vehicle will collide with the vehicle behind, the lane change is forbidden (see, for example, Patent Document 2).

PRIOR ART DOCUMENTS

Patent Documents

Patent Document 1: Japanese Patent Application. Laid-Open No. 2001-247023
Patent Document 2: Japanese Patent Application Laid-Open No. 2009-280015

DISCLOSURE OF THE INVENTION

Problem to be Solved by the Invention

The technology described in the aforementioned Patent Document 2 requires a device for detecting a vehicle running diagonally behind the driver's own vehicle, leading to problems of an increased number of components and increased manufacturing cost.

The present invention has been made in view of the above-described circumstances, and an object of the present invention is to provide a technology that enables avoidance of situations in which the driver's own vehicle enters the course of a vehicle traveling behind with a change in the course of the driver's own vehicle, without relying upon a device for detecting the vehicle traveling diagonally behind the driver's own vehicle in a driving assistance apparatus that causes the driver's own vehicle to change its course to avoid a collision with a solid object existing in the course of the vehicle.

Means for Solving the Problem

To achieve the above object, in a driving assistance apparatus for a vehicle according to the present invention that causes a driver's own vehicle to change its course to avoid a collision with a solid object existing in the course of the driver's own vehicle, a change of the course of the driver's own vehicle is forbidden when there is not a lane boundary on the road between the driver's own vehicle and an obstacle.

Specifically, a driving assistance apparatus for a vehicle according to the present invention is adapted to cause a driver's own vehicle to change its course when an obstacle exists in the course of the driver's own vehicle and comprises:

detection means for detecting a dividing line indicating a lane boundary on a road; and forbiddance means that forbids a change of the course of the driver's own vehicle when a dividing line indicating a lane boundary is not detected on the road between the driver's own vehicle and an obstacle.

When there is not a dividing line (e.g. white or yellow line) indicating a lane boundary on the road between the driver's own vehicle and a solid object existing in the course of the driver's own vehicle, the solid object may exist in the lane in which the driver's own vehicle is traveling. Therefore, if the course of the driver's own vehicle is changed to avoid a collision of the driver's own vehicle with the solid object, there is a possibility that the driver's own vehicle will depart from its driving lane and enter another lane. If the driver's own vehicle is caused to enter another lane when another vehicle is traveling in the other lane, in particular if another vehicle is traveling diagonally behind the driver's own vehicle in the other lane, a collision of the driver's own vehicle with the vehicle behind may possibly be caused.

As a countermeasure to this, the driving assistance apparatus for a vehicle according to the present invention forbids a change of the course of the driver's own vehicle when a dividing line indicating a lane boundary is not detected on the road between the driver's own vehicle and the solid object existing in the course of the driver's own vehicle (namely, when there is a possibility that the solid object exists in the lane in which the driver's own vehicle is traveling). Then, the driver's own vehicle is prevented from departing from the driving lane to enter another lane (namely, lane change is prevented). In consequence, a situation in which the driver's own vehicle enters the course of a vehicle traveling behind with a change in its course can be prevented from occurring.

Therefore, according to the present invention, a collision of the driver's own vehicle and a vehicle traveling behind caused by a change of the course of the driver's own vehicle can be prevented from occurring without depending on a device for detecting a vehicle traveling diagonally behind the driver's own vehicle.

The driving assistance apparatus according to the present invention may further include deceleration means for decelerating the driver's own vehicle when a change of the course of the driver's own vehicle is forbidden by the forbiddance means. With this feature, when a change of the course of the driver's own vehicle is forbidden, deceleration of the driver's own vehicle can prevent it from colliding with the solid object or reduce the impact of a collision of the drive's own vehicle with the solid object if it occurs.

The way of decelerating the driver's own vehicle by the deceleration means may be operating a friction brake that converts rotational energy of the wheels into thermal energy, converting the rotational energy of the wheels into electrical energy (regeneration), or increasing the engine brake by changing the change gear ratio of the change gear.

The driving assistance apparatus for a vehicle according to the present invention may further include changing means for changing, when a dividing line indicating a lane boundary is detected on the road between the driver's own vehicle and an obstacle, the course of the driver's own vehicle so as to prevent the driver's own vehicle from deviating out of the lane boundary.

When a dividing line indicating a lane boundary is detected on the road between the driver's own vehicle and an obstacle existing in the course of the driver's own vehicle, the solid object must exist outside the lane in which the driver's own vehicle is traveling. In such a case, if the course of the driver's own vehicle is changed in such a way as to prevent the driver's own vehicle from deviating out of the lane boundary, the driver's own vehicle is kept within the driving lane. Thus, a situation in which the driver's own vehicle enters the course of a vehicle traveling behind in another lane can be prevented from occurring, while a collision with the solid object can be avoided.

The way of changing the course of the driver's own vehicle by the changing means may be changing the steering angle of wheels or applying different braking forces to the four wheels of the vehicle (e.g. applying different operational oil pressures or brake oil pressures to frictional brakes provided for the four wheels respectively).

Effects of the Invention

According to the present invention, situations in which the driver's own vehicle enters the course of a vehicle behind with a change in the course of the driver's own vehicle can be prevented from occurring without depending on a device for detecting the vehicle travelling diagonally behind the driver's own vehicle in a driving assistance apparatus that causes the driver's own vehicle to change its course to avoid a collision with a solid object existing in the course of the driver's own vehicle.

THE BEST MODE FOR CARRYING OUT THE INVENTION

In the following, a specific embodiment of the present invention will be described with reference to the drawings. Here, a case in which the present invention is applied to a system that detects a track of the driver's own vehicle and an obstacle and provides assistance for avoiding departure from the detected track and/or collision with the obstacle. The "assistance" mentioned herein is processing executed at a timing that allows the driver's own vehicle to avoid a solid object or obstacle, which is executed earlier than collision damage reduction processing that is executed in the case where a collision of the vehicle and the obstacle is unavoidable. The features described in the following in connection with the embodiment are intended to illustrate a mode of the present invention and not intended to limit the present invention.

Figure 1:
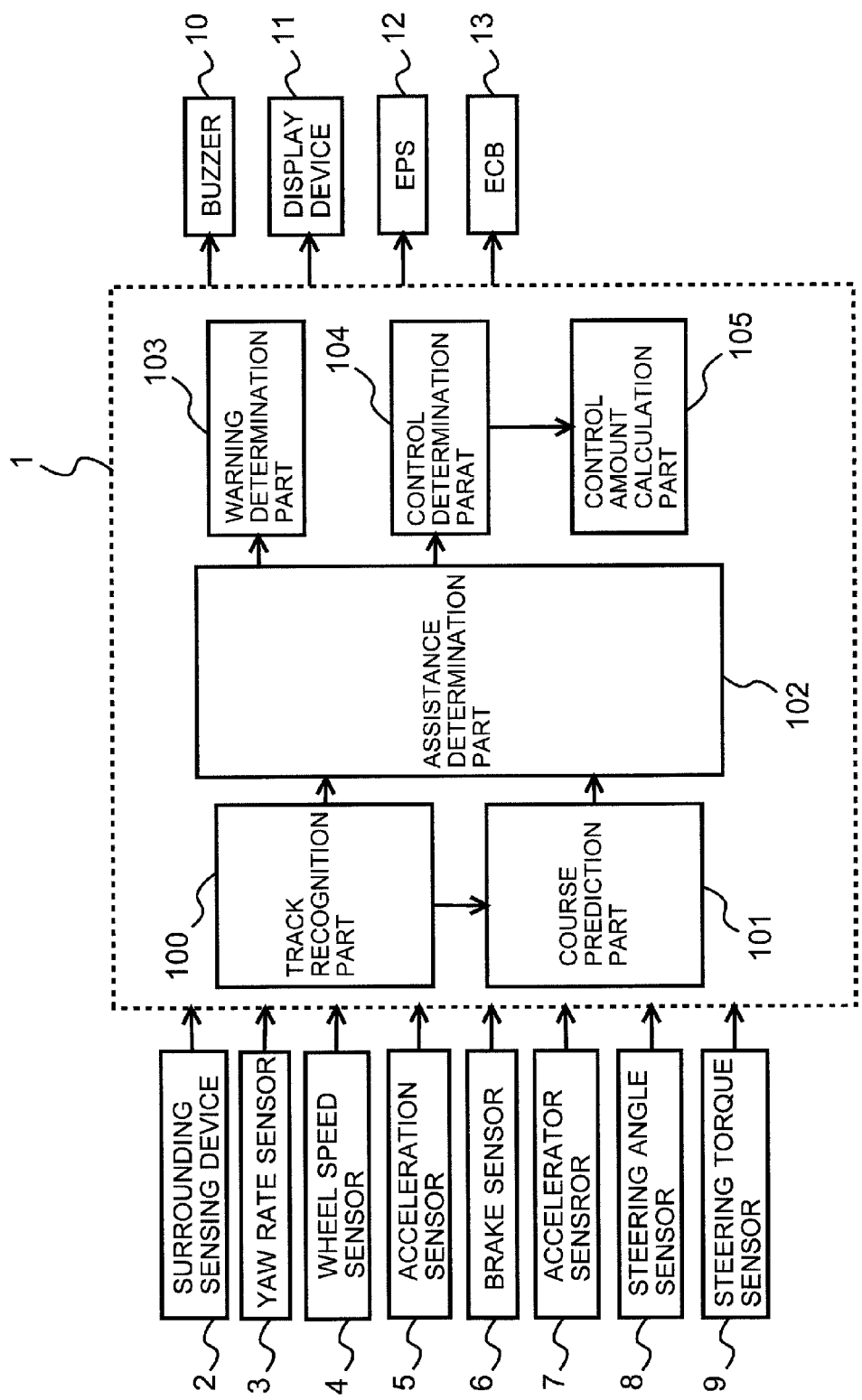
FIG. 1 is a diagram showing the configuration of a driving assistance system for a vehicle according to the present invention.

FIG. 1 is a block diagram showing the construction of a driving assistance system for a vehicle to which the present invention is applied on a function-by-function basis. As shown in FIG. 1, the vehicle is equipped with a control unit (ECU) 1 for driving assistance. The ECU 1 is an electronic control unit including a CPU, a ROM, a RAM, a backup RAM, and I/O interface etc. The ECU 1 is electrically connected with various sensors including a surrounding sensing device 2, a yaw rate sensor 3, a wheel speed sensor 4, an acceleration sensor 5, a brake sensor 6, an accelerator sensor 7, a steering angle sensor 8, and a steering torque sensor 9. Signals output from these sensors are input to the ECU 1.

The surrounding sensing device 2 includes at least a stereo camera and may also include other measurement devices such as an LIDAR (Laser Imaging Detection And Ranging), an LRF (Laser Range Finder), and a millimeter-wave radar. The surrounding sensing device 2 outputs information about the relative position (e.g. relative distance and/or relative angle) of the driver's own vehicle and a solid object existing ahead of the vehicle and image information about road markings existing on the road ahead of the vehicle.

The yaw rate sensor 3 is mounted, for example, on the body of the driver's own vehicle and outputs an electrical signal correlating with the yaw rate of the driver's own vehicle. The wheel speed sensor 4 is attached to a wheel of the vehicle and outputs an electrical signal correlating with the running speed of the vehicle (vehicle speed). The acceleration sensor 5 outputs electrical signals correlating with the acceleration of the driver's own vehicle in the front-rear direction (longitudinal acceleration) and the acceleration of the driver's own vehicle in the left-right direction (lateral acceleration).

The brake sensor 6 is attached, for example, to a brake pedal provided in the cabin and outputs an electrical signal correlating with the operation torque of (or depression force acting on) the brake pedal. The accelerator sensor 7 is attached, for example, to an accelerator pedal provided in the cabin and outputs an electrical signal correlating with the operation torque of (or depression force acting on) the accelerator pedal. The steering angle sensor 8 is attached, for example, to a steering rod connected with a steering wheel provided in the cabin and outputs an electrical signal correlating with the rotational angle of the steering wheel (steering angle) relative to a neutral position. The steering torque sensor 9 is attached to the steering rod and outputs an electrical signal correlating with the toque (steering torque) exerted on the steering wheel.

The ECU 1 is also connected with various devices such as a buzzer 10, a display device 11, an electric power steering (EPS) 12, and an electronically controlled brake (ECB) 13. These devices are electrically controlled by the ECU 1.

The buzzer 10 is provided, for example, in the cabin to provide warning sound or the like. The display device 11 is provided, for example, in the cabin to display various messages and warning light. The electric power steering (EPS) 12 is a device that assists the steering torque of the steering wheel utilizing torque generated by an electric motor. The electronically controlled brake (ECB) 13 is a device that electrically adjusts the operation oil pressure (brake oil pressure) of friction brakes provided for the respective wheels.

To control various devices using signals output from the above-described various sensors, the ECU 1 has the following functions. The ECU 1 has a track recognition part 100, a course prediction part 101, an assistance determination part 102, a warning determination part 103, a control determination part 104, and a control amount calculation part 105.

The track recognition part 100 generates information about the road (track) on which the driver's own vehicle will travel, on the basis of information output from the surrounding sensing device 2. For example, the track recognition part 100 generates information about the positions of solid objects that can be obstacles to the driver's own vehicle and dividing lines (e.g. white or yellow lines) indicating boundaries of the lane in which the vehicle is traveling and information about the posture of the driver's own vehicle relative to such solid objects and dividing lines (e.g. the distances and yaw angles relative to them), in a coordinate system having an origin at the position of the driver's own vehicle. The solid objects mentioned above are not limited to stationary objects, but they may be moving objects. The track recognition part 100 corresponds to the detection means according to the present invention.

The course prediction part 101 specifies a route (or course) which the driver's own vehicle is predicted to follow, in the coordinate system generated by the track recognition part 100. Specifically, the course prediction part 101 determines the lateral acceleration of the drive's own vehicle at the present time from a signal output from the acceleration sensor 5 and specifies a course which the driver's own vehicle is predicted to follow if the vehicle will run while maintaining the present lateral acceleration.

The assistance determination part 102 determines whether driving assistance is to be performed or not based on the information generated by the track recognition part 100 and the course predicted by the course prediction part 101. Specifically, the assistance determination part 102 enables the execution of driving assistance when a solid object that can be an obstacle exists in the course of the driver's own vehicle.

The warning determination part 103 warns the driver by buzzing of the buzzer 10 and/or display of a warning message or warning light on the display device 11, when the assistance determination part 102 enables the execution of driving assistance.

For example, the warning determination part 103 may cause the buzzer 10 to buzz or cause the display device 11 to display a warning message or warning light immediately at the time when the assistance determination part 102 enables the execution of driving assistance.

Alternatively, the warning determination part 103 may cause the buzzer 10 to buzz or cause the display device 11 to display the warning message or warning light at the time when the distance between the driver's own vehicle and a solid object becomes equal to or shorter than a predetermined distance.

Alternatively, the warning determination part 103 may calculate the time taken for the driver's own vehicle to reach a solid object and cause the buzzer 10 to buzz or cause the display device 11 to display the warning message or warning light at the time when the result of the calculation becomes equal to or shorter than a predetermined time.

The predetermined distance and the predetermined time mentioned above may be changed responsive to a signal output from the yaw rate sensor 3 and/or a signal output from the wheel speed sensor 4. For example, the predetermined distance or the predetermined time may be set longer when the vehicle speed is high than when it is low. The predetermined distance or the predetermined time may be set longer when the yaw rate is high than when it is low.

The way of warning the driver is not limited to buzz of the buzzer 10 or display of a warning message or warning light on the display device 11, but other methods such as intermittently changing the fastening torque of the sheet belt may be employed.

When driving assistance is enabled by the assistance determination part 102, the control determination part 104 determines the timing for causing the electric power steering (EPS) 12 and/or the electronically controlled brake (ECB) 13 to operate to avoid a collision of the driver's own vehicle with a solid object.

Specifically, the control determination part 104 may cause the electric power steering (EPS) 12 and/or the electronically controlled brake (ECB) 13 to operate at the time when the distance between the driver's own vehicle and the solid object becomes equal to or smaller than a predetermined distance. Alternatively, the control determination part 104 may calculate the time taken for the driver's own vehicle to reach the solid object and cause the electric power steering (EPS) 12 and/or the electronically controlled brake (ECB) 13 to operate at the time when the result of the calculation becomes equal to or shorter than a predetermined time.

The predetermined distance and the predetermined time referred to by the control determination part 104 may be varied in relation to the vehicle speed and the yaw rate, as with the predetermined distance and the predetermined time referred to by the warning determination part 103. The predetermined distance and the predetermined time referred to by the control determination part 104 are to be set equal to or shorter than the predetermined distance and the predetermined time referred to by the warning determination part 103.

When the timing for causing the electric power steering (EPS) 12 and/or the electronically controlled brake (ECB) 13 to operate is determined by the control determination part 104, the control amount calculation part 105 calculates a control amount(s) for the electric power steering (EPS) 12 and/or the electronically controlled brake (ECB) 13 and controls the electric power steering (EPS) 12 and/or the electronically controlled brake (ECB) 13 in accordance with the control amount(s) thus calculated and the timing determined by the control determination part 104.

For example, the control amount calculation part 105 calculates a yaw rate needed to avoid a collision of the driver's own vehicle with a solid object. Then, the control amount calculation part 105 determines a control amount (steering torque) for the electric power steering (EPS) 12 and a control amount (brake oil pressure) for the electronically controlled brake (ECB) 13 so as to make the yaw rate of the driver's own vehicle (a signal output from the yaw rate sensor 3) equal to the target yaw rate. In connection with this, the relationship between the target yaw rate and the steering torque and the relationship between the target yaw rate and the brake oil pressure may be prepared in advance as maps.

The method of decelerating the vehicle is not limited to operating the friction brake by the electronically controlled brake (ECB) 13, but other methods such as converting the kinetic energy of the vehicle into electrical energy (regeneration) and increasing the engine brake by changing the change gear ratio of the change gear may be employed. The method of changing the yaw rate of the vehicle is not limited to changing the steering angle by the electric power steering (EPS) 12, but other methods such as applying different brake oil pressures to the right and left wheels of the vehicle may be employed.

Performing driving assistance using the electric power steering (EPS) 12 leads to a change of the course of the driver's own vehicle. If the change of the course of the driver's own vehicle involves a lane change, there is a possibility that the driver's own vehicle will enter the course of a vehicle traveling behind in the lane in which the driver's own vehicle will travel after the lane change.

Figure 2:
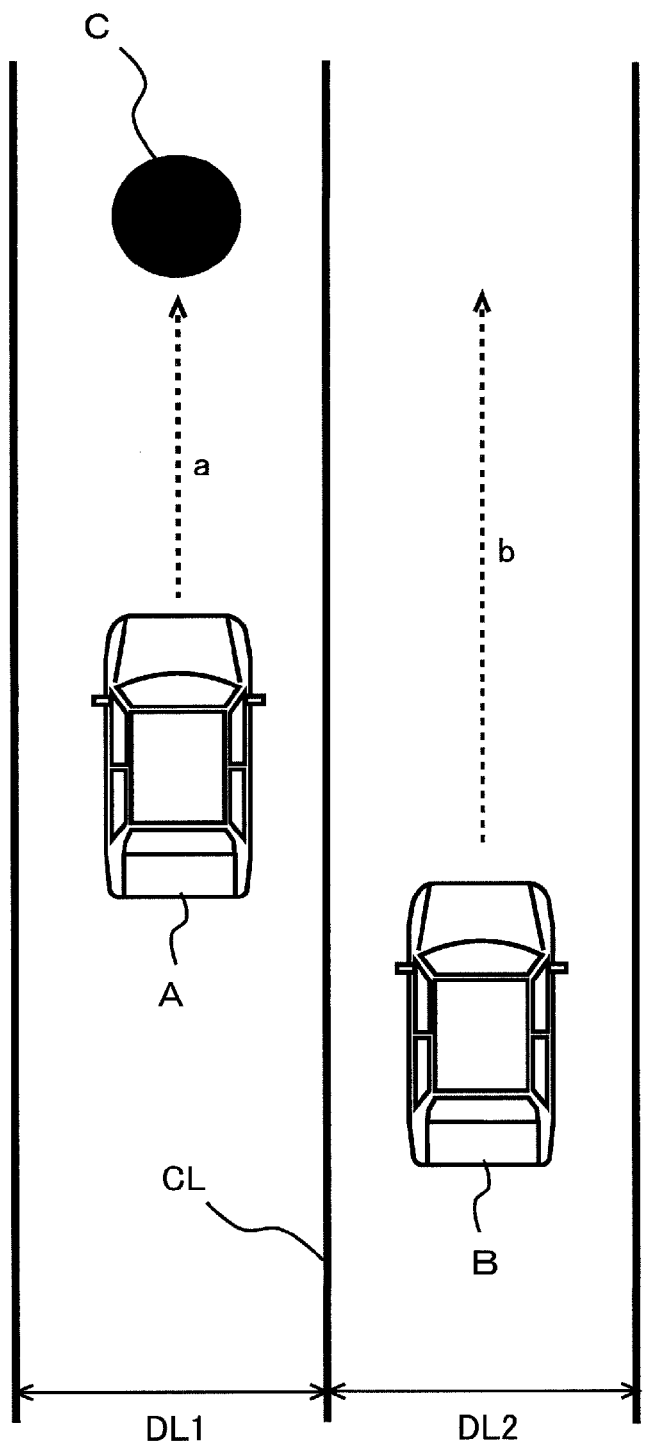
FIG. 2 is a diagram showing a first case of a situation in which there is not a dividing line indicating a lane boundary on the road between the driver's own vehicle and an obstacle.
Figure 3:
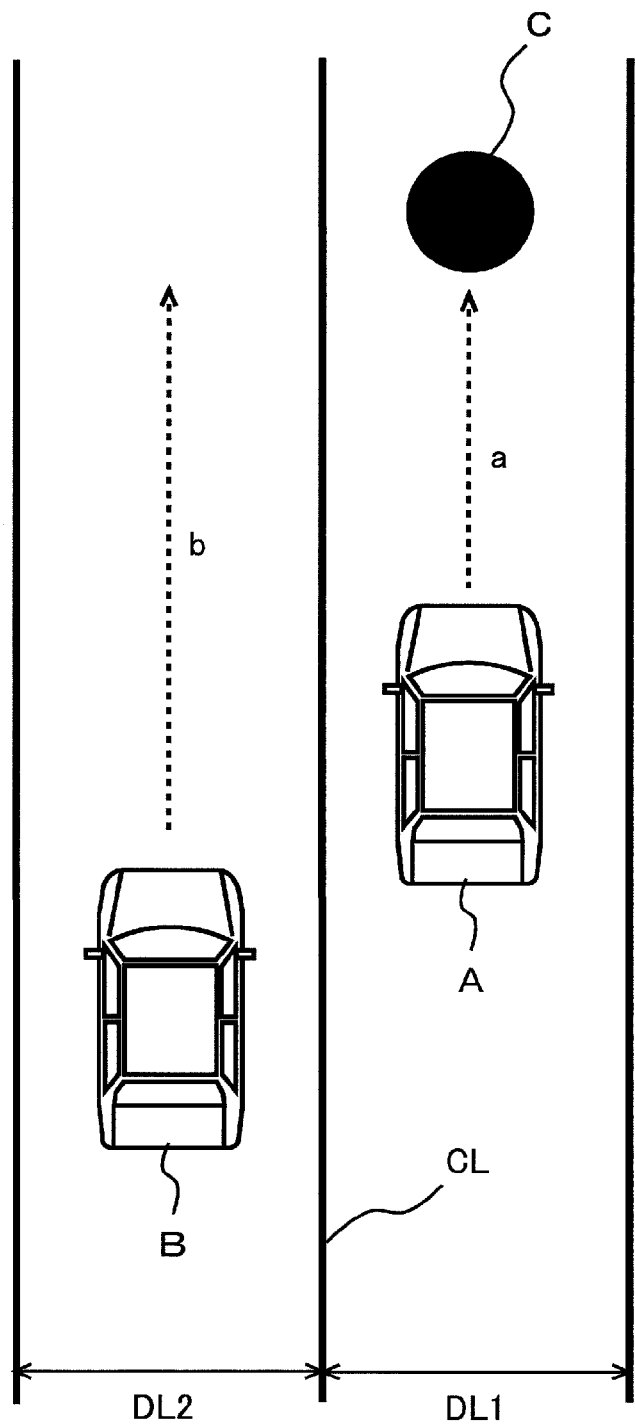
FIG. 3 is a diagram showing a second case of a situation in which there is not a dividing line indicating a lane boundary on the road between the driver's own vehicle and an obstacle.

For example, in cases where, as shown in FIGS. 2 and 3, the driver's own vehicle A travels in a first lane DL1 and a vehicle B travels diagonally behind the driver's own vehicle A in a second lane DL2 adjacent to the first lane DL1, if an obstacle C existing in the course of the driver's own vehicle A is detected, the control amount calculation part 105 controls the electric power steering (EPS) 12 and the electronically controlled brake (ECB) 13 so as to change the course of the driver's own vehicle A.

Figure 4:
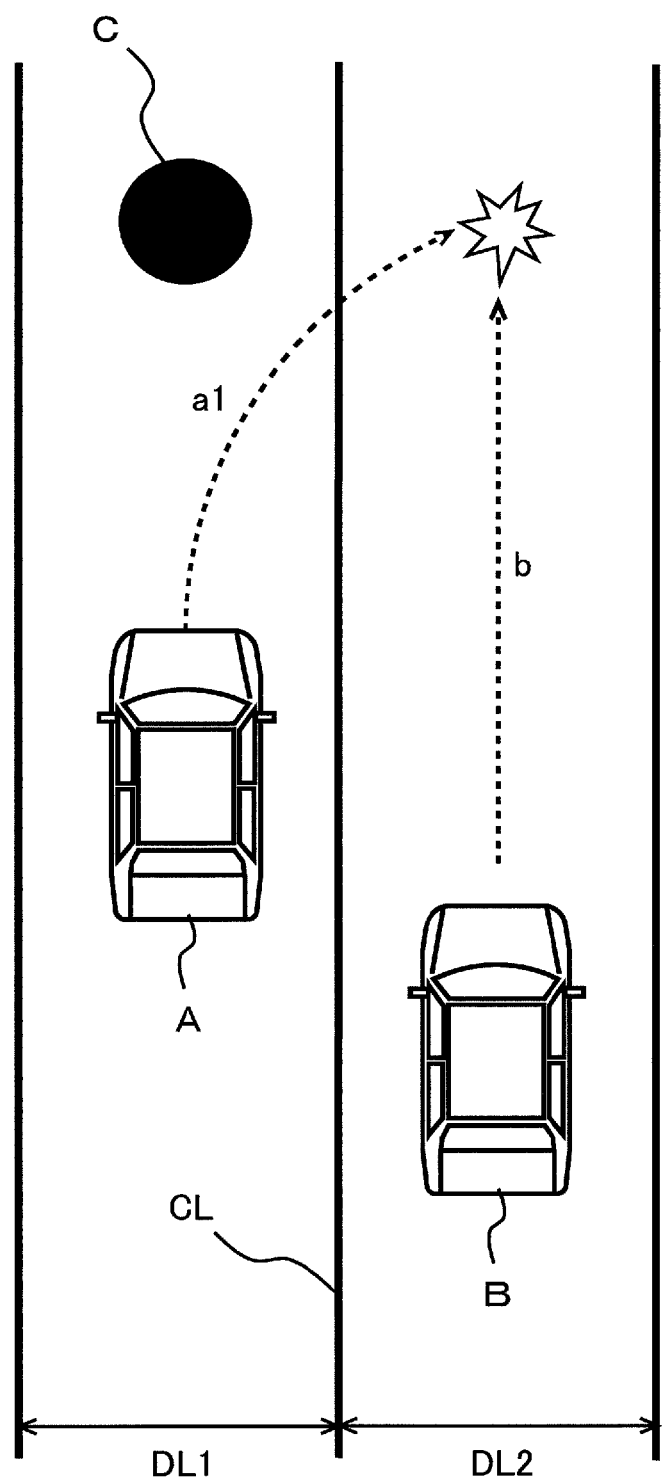
FIG. 4 is a diagram showing a first case of a situation in which driving assistance involving a course change is performed when there is not a dividing line indicating a lane boundary on the road between the driver's own vehicle and an obstacle.
Figure 5:
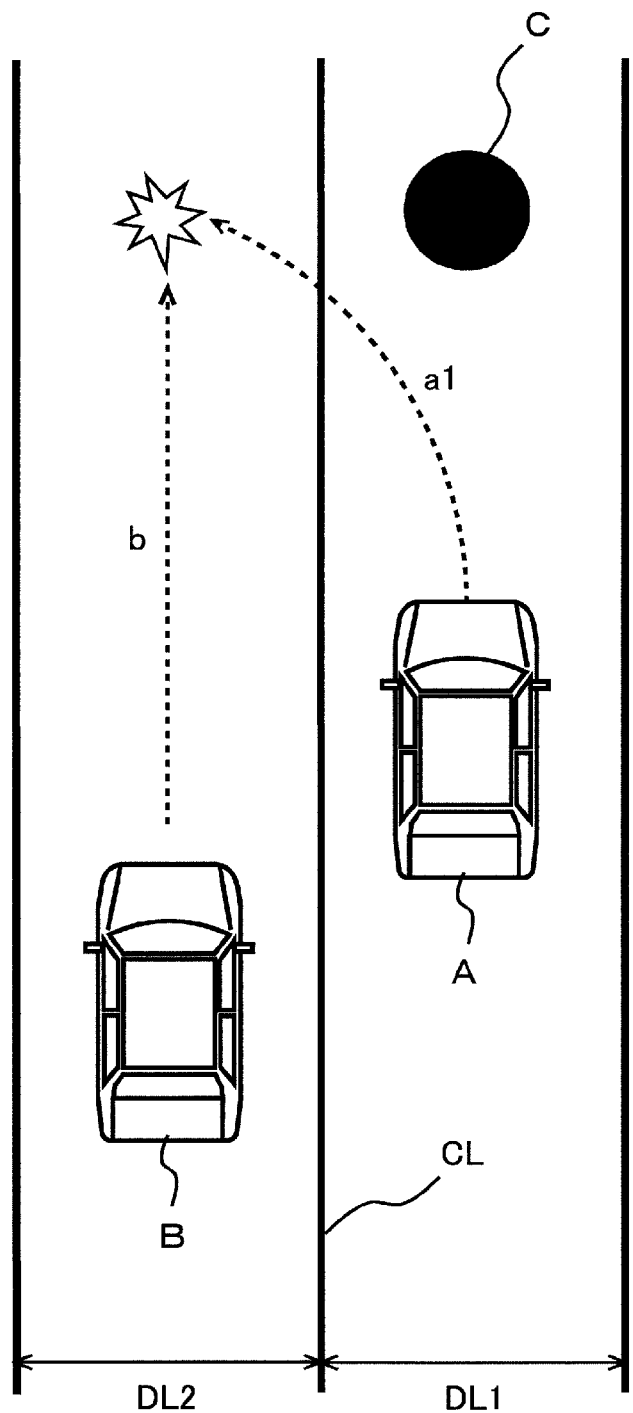
FIG. 5 is a diagram showing a second case of a situation in which driving assistance involving a course change is performed when there is not a dividing line indicating a lane boundary on the road between the driver's own vehicle and an obstacle.

In these cases, there is a possibility that the course of the driver's own vehicle A is changed into a course crossing the dividing line CL indicating the boundary of the first lane DL1 and the second lane DL2, namely a course a1 involving a lane change, as shown in FIGS. 4 and 5. If the course of the driver's own vehicle A is changed in the manners shown in FIGS. 4 and 5, the course a1 after change may cross the course b of the vehicle B behind. In other words, there is a possibility that driving assistance may cause the driver's own vehicle A to enter the course b of the vehicle B behind.

In view of the above described situation, when a dividing line CL indicating a boundary of the lane DL is not detected on the road between the driver's own vehicle A and the obstacle C, the control amount calculation part 105 forbids the driver's own vehicle A to change its course and performs driving assistance that enables the driver's own vehicle A to avoid a collision with the obstacle C.

Specifically, the control amount calculation part 105 controls the electronically controlled brake (ECB) 13 in such a way as to cause the driver's own vehicle A to stop before reaching the obstacle C. If driving assistance is performed in this way, driving assistance involving a course change (or lane change) is not performed when the obstacle C exists in the driving lane DL1 of the driver's own vehicle A. Consequently, a situation in which performing driving assistance causes the driver's own vehicle A to enter the course of the vehicle B behind can be prevented from occurring. Moreover, a device for detecting another vehicle traveling alongside or behind the driver's own vehicle is not needed, possibly leading to reduction in the increase in the number of components and reduction in the increase in the cost.

Figure 6:
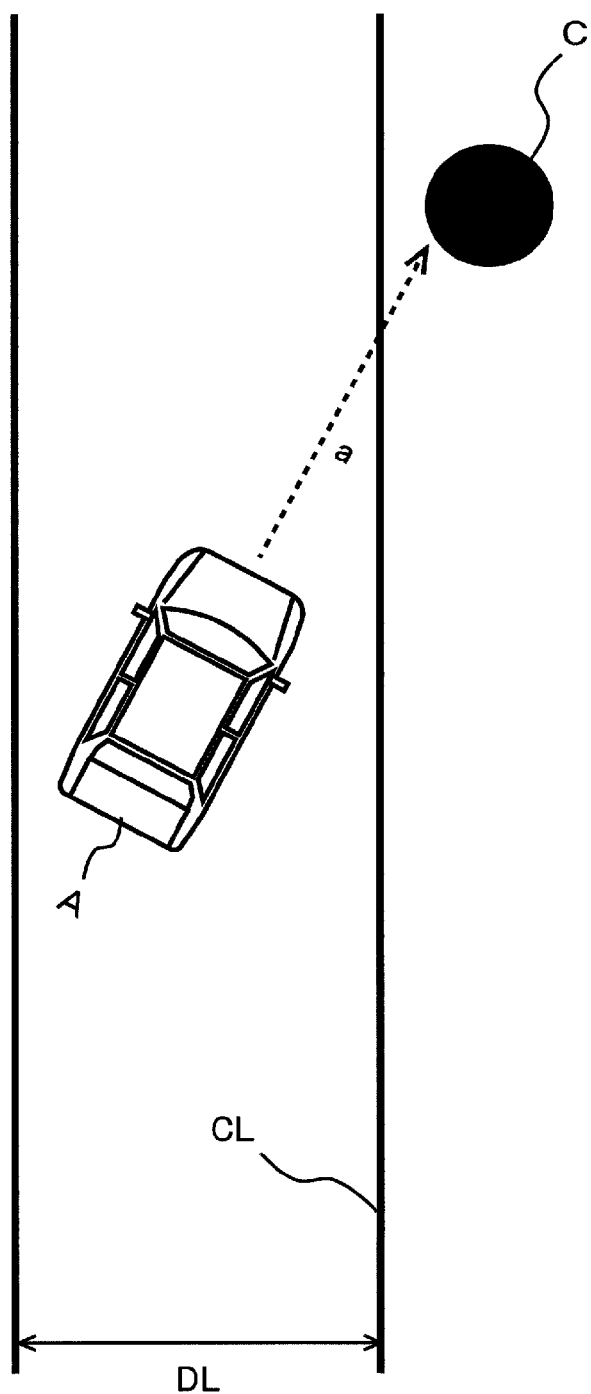
FIG. 6 is a diagram showing a first case of a situation in which there is a dividing line indicating a lane boundary on the road between the driver's own vehicle and an obstacle.
Figure 7:
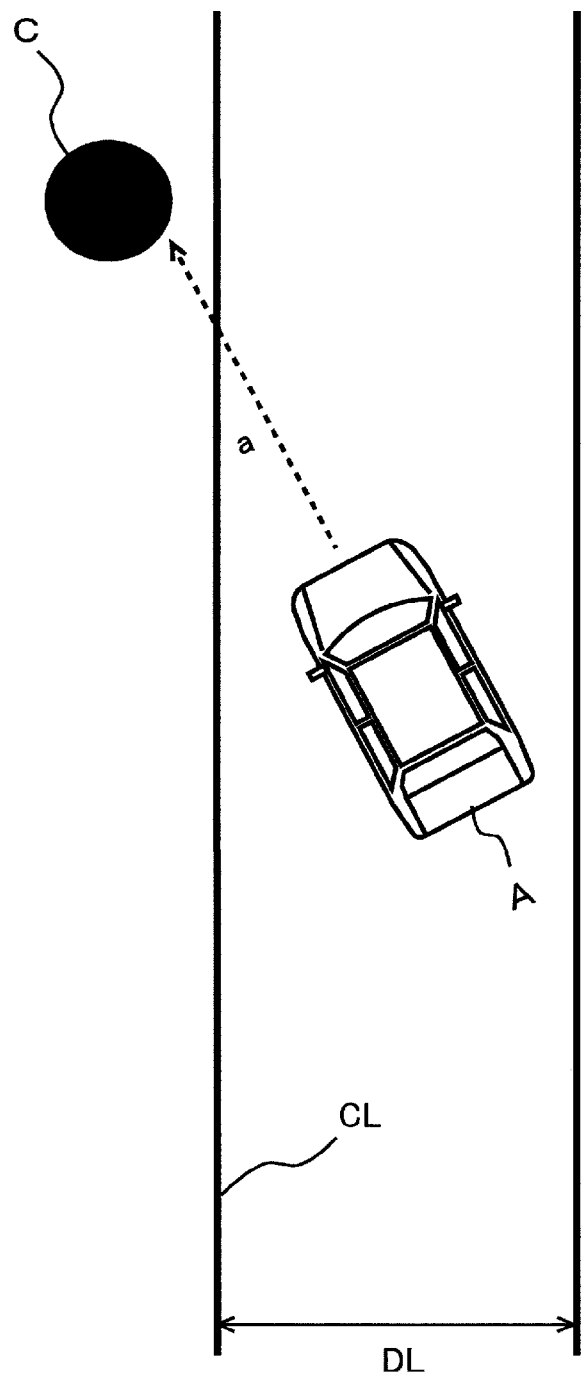
FIG. 7 is a diagram showing a second case of a situation in which there is a dividing line indicating a lane boundary on the road between the driver's own vehicle and an obstacle.

On the other hand, in cases where, as shown in FIGS. 6 and 7, there is a dividing line CL indicating a boundary of the lane DL on the road between the driver's own vehicle A and an obstacle C, the control amount calculation part 105 allows the driver's own vehicle A to change its course and performs driving assistance that enables the driver's own vehicle to avoid a collision with the obstacle C. Specifically, the control amount calculation part 105 calculates a target yaw rate needed to avoid a collision of the driver's own vehicle A with the obstacle C and controls the electric power steering (EPS) 12 and the electronically controlled brake (ECB) 13 in such a way as to make the actual yaw rate equal to the target yaw rate.

Figure 8:
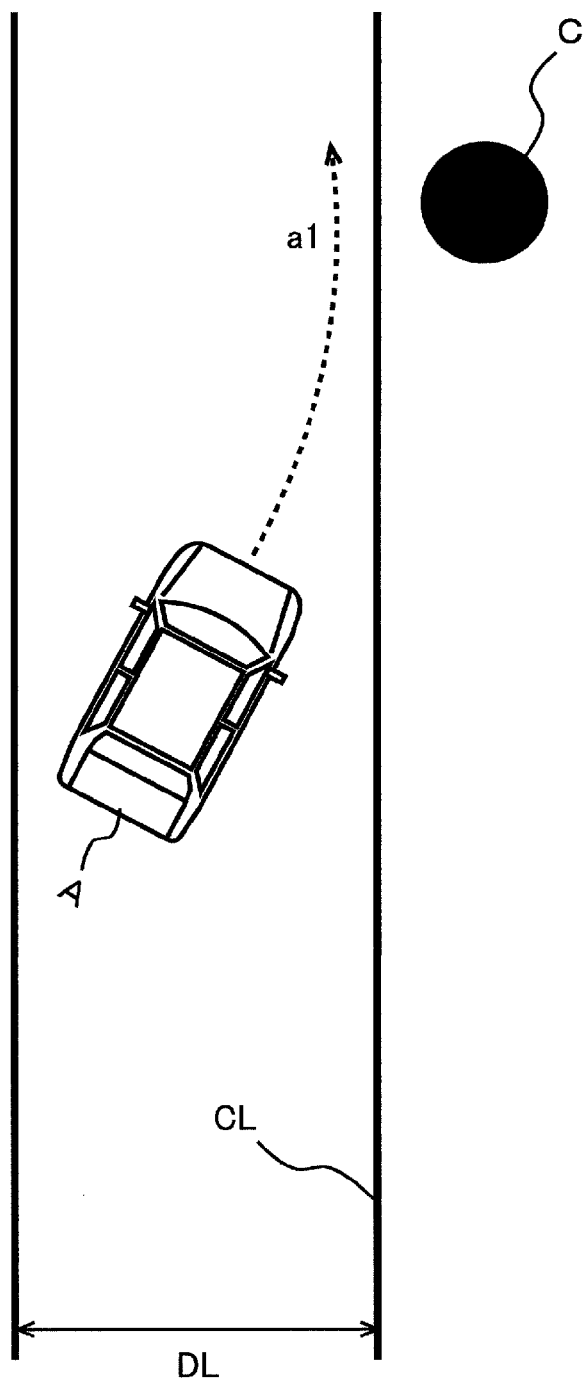
FIG. 8 is a diagram showing a first case of a situation in which driving assistance involving a course change is performed when there is a dividing line indicating a lane boundary on the road between the driver's own vehicle and an obstacle.
Figure 9:
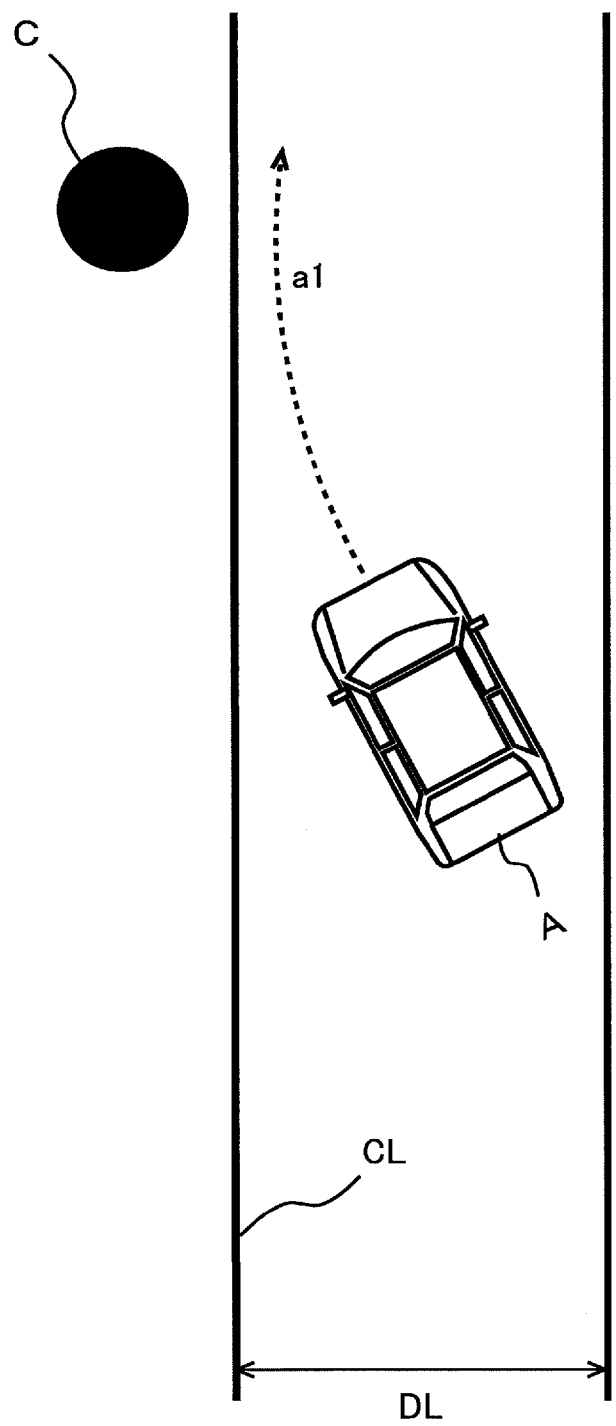
FIG. 9 is a diagram showing a second case of a situation in which driving assistance involving a course change is performed when there is a dividing line indicating a lane boundary on the road between the driver's own vehicle and an obstacle.

The situation in which there is a dividing line CL on the road between the driver's own vehicle A and an obstacle C can be considered to be a situation in which the obstacle C exists outside the lane DL in which the driver's own vehicle A is traveling and the driver's own vehicle A is about to depart from the driving lane DL. Then, if as shown in FIGS. 8 and 9, the course of the driver's own vehicle A is changed into a course a1 running along the driving lane DL, the driver's own vehicle A can be prevented from colliding with another vehicle and also from colliding with the obstacle C. Therefore, in the process of calculating the target yaw rate, the control amount calculation part 105 calculates a target yaw rate needed to change the actual course of the driver's own vehicle A into the course a1 described above and controls the electric power steering (EPS) 12 and the electronically controlled brake (ECB) 13 in such a way as to make the actual yaw rate equal to the target yaw rate.

Figure 10:
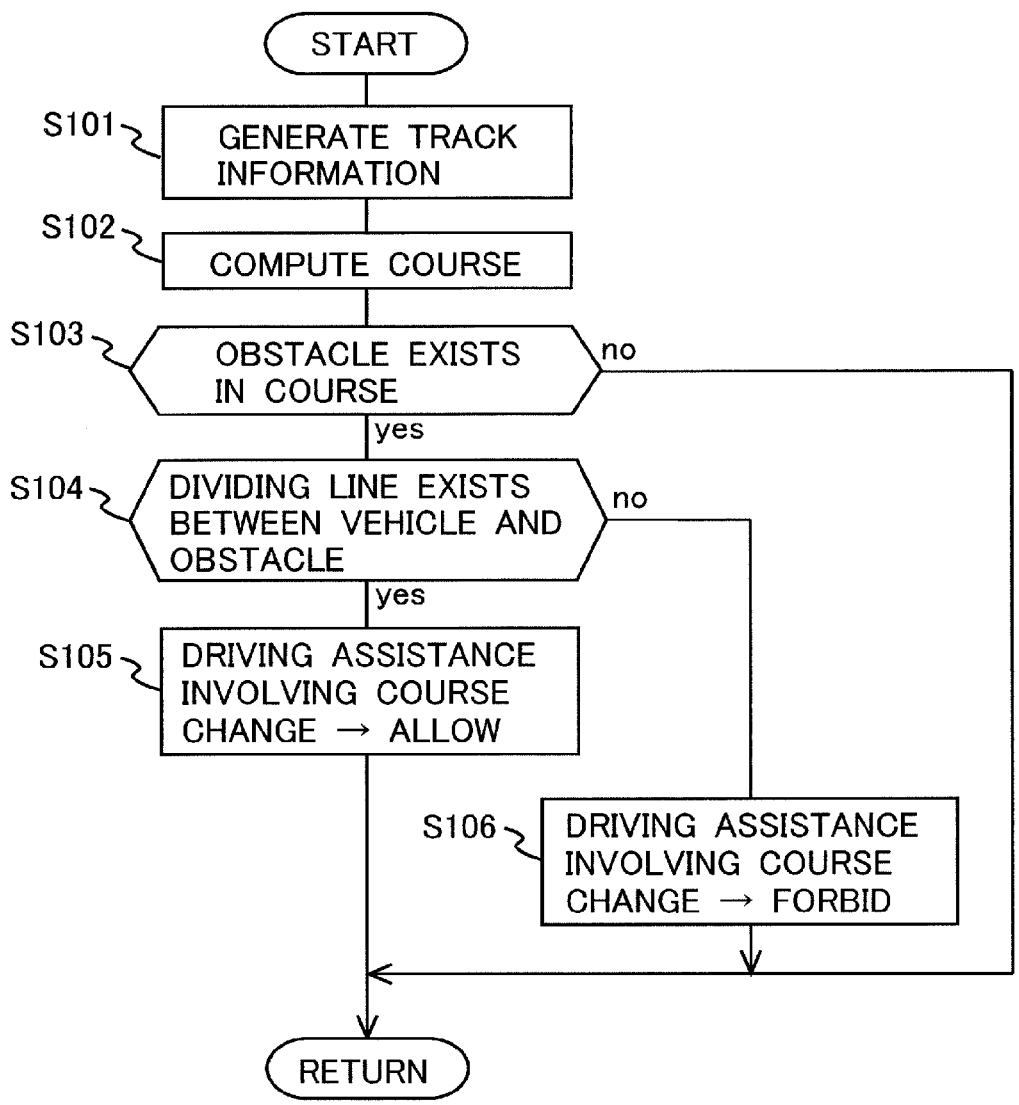
FIG. 10 is a flow chart of a processing routine executed by an ECU in performing driving assistance.

In the following, a process of executing driving assistance in this embodiment will be described with reference to FIG. 10. FIG. 10 is a flow chart of a processing routine, which is stored in, for example, the ROM of the ECU 1 and executed repeatedly by the ECU 1.

In the processing routine shown in FIG. 10, first in step S101, the ECU 1 generates information about the track on which the driver's own vehicle will travel (track information) on the basis of a signal output from the surrounding sensing device 2. Specifically, the ECU 1 generates information about positions of solid objects that can be obstacles to the driver's own vehicle and dividing lines indicating boundaries of the lane in which the vehicle is traveling and information about the posture of the driver's own vehicle relative to such solid objects and dividing lines, in a coordinate system having an origin at the position of the driver's own vehicle.

In step S102, the ECU 1 specifies a path (or course) along which the driver's own vehicle is predicted to travel in the coordinate system generated in the above step S101. Specifically, the ECU 1 calculates the present lateral acceleration of the driver's own vehicle from a signal output from the accelerator sensor 5 and specifies a course which the driver's own vehicle will follow if the vehicle will travel while maintaining the present lateral acceleration.

In step S103, the ECU 1 determines whether or not there is a solid object that can be an obstacle in the course of the driver's own vehicle on the basis of the coordinate system generated in the above step S101 and the course predicted in the above step S102. If the determination in step S103 is negative, the ECU 1 terminates the execution of this routine without performing driving assistance. On the other hand, if the determination in step S103 is affirmative, the ECU 1 proceeds to step S104.

In step S104, the ECU 1 determines whether or not there is a dividing line indicating a lane boundary on the road between the driver's own vehicle and the obstacle in the coordinate system generated in the above step S101. If the determination in step S104 is affirmative, the ECU 1 executes the processing of step S105. On the other hand, if the determination in step S104 is negative, the ECU 1 executes the processing of step S106.

In step S105, the ECU 1 allows the execution of driving assistance involving a change of the course of the driver's own vehicle. In this process, the ECU 1 firstly performs driving assistance using the buzzer 10 or the display device 11. Then, if the driver does not perform operations for avoiding the obstacle, the ECU 1 performs driving assistance using at least one of the electric power steering (EPS) 12 and the electronically controlled brake (ECB) 13. Specifically, the ECU 1 calculates a target yaw rate needed for the driver's own vehicle to travel without crossing the aforementioned dividing line and controls at least one of the electric power steering (EPS) 12 and the electronically controlled brake (ECB) 13 in such a way as to make the actual yaw rate equal to the target yaw rate.

Performing driving assistance in the above-described manner enables the driver's own vehicle to be prevented from departing from the driving lane and to avoid a collision with the obstacle. In consequence, a collision with the obstacle can be avoided while preventing a situation in which the driver's own vehicle enters the course of another vehicle traveling behind in another lane from occurring. The changing means according to the present invention is implemented by executing the processing of step S105 by the ECU 105.

In step S106, the ECU 1 forbids the execution of driving assistance involving a change of the course of the driver's own vehicle. In other words, the ECU 1 disables the execution of driving assistance using the electric power steering (EPS) 12. In this case, the ECU 1 firstly performs driving assistance using the buzzer 10 or the display device 11. Then, if the driver does not perform operations for avoiding the obstacle, the ECU 1 performs driving assistance using only the electronically controlled brake (ECB) 13. Specifically, the ECU 1 calculates a deceleration needed for the driver's own vehicle to stop before reaching the obstacle and a target brake oil pressure needed to achieve this deceleration. The ECU 1 controls the electronically controlled brake (ECB) 13 in such a way as to make the actual brake oil pressure equal to the target brake oil pressure.

Performing driving assistance in the above-described manner enables the driver's own vehicle to avoid a collision with the obstacle while disabling the driver's own vehicle to change its course. In other words, a collision with the obstacle can be avoided while preventing a situation in which the driver's own vehicle enters the course of another vehicle traveling behind in another lane from occurring. In consequence, a situation in which performing driving assistance causes a collision of the driver's own vehicle with a vehicle behind can be prevented from occurring. Moreover, increases in the number of components and manufacturing cost can be prevented, because a device for detecting other vehicles traveling alongside or behind the driver's own vehicle is not needed. The forbiddance means and deceleration means according to the present invention are implemented by executing the processing of step S106 by the ECU 1.

According to the above-described embodiment, situations in which the driver's own vehicle enters the course of a vehicle behind with a change in the course of the driver's own vehicle can be prevented from occurring without depending on a device for detecting the vehicle traveling diagonally behind the driver's own vehicle in a driving assistance apparatus that causes the driver's own vehicle to change its course when a solid object exists in the course of the driver's own vehicle.

DESCRIPTION OF THE REFERENCE NUMERALS AND SYMBOLS

1: ECU
2: surrounding sensing device
3: yaw rate sensor
4: wheel speed sensor
5: acceleration sensor
6: brake sensor
7: accelerator sensor
8: steering angle sensor
9: steering torque sensor
10: buzzer
11: display device

The invention claimed is:

1. An driving assistance apparatus for a vehicle that causes a driver's own vehicle to change its course when an obstacle exists in the course of the driver's own vehicle, comprising:
   detection unit for detecting a dividing line indicating a lane boundary on a road; and
   forbiddance unit that allows a change of the course of the driver's own vehicle when a dividing line indicating lane boundary is detected on the road between the driver's own vehicle and an obstacle and forbids a change of the course of the driver's own vehicle when a dividing line indicating a lane boundary is not detected on the road between the driver's own vehicle and an obstacle.

2. A driving assistance apparatus for a vehicle according to claim 1, further comprising deceleration unit for decelerating the driver's own vehicle when a change of the course of the driver's own vehicle is forbidden by the forbiddance unit.

3. A driving assistance apparatus for a vehicle according to claim 1, further comprising changing unit for changing, when a dividing line indicating a lane boundary is detected on the road between the driver's own vehicle and an obstacle, the course of the driver's own vehicle so as to prevent the driver's own vehicle from deviating out of the lane boundary.

4. A driving assistance apparatus for a vehicle according to claim 2, further comprising changing unit for changing, when a dividing line indicating a lane boundary is detected on the road between the driver's own vehicle and an obstacle, the course of the driver's own vehicle so as to prevent the driver's own vehicle from deviating out of the lane boundary.

\* \* \* \* \*